United States Patent
Vargantwar et al.

(10) Patent No.: US 7,826,370 B1
(45) Date of Patent: *Nov. 2, 2010

(54) DYNAMIC PAYLOAD-SIZE THRESHOLD FOR TRIGGERING AN AUXILIARY PILOT

(75) Inventors: Sachin R. Vargantwar, Overland Park, KS (US); Debasish Sarkar, Irvine, CA (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/432,311

(22) Filed: Apr. 29, 2009

(51) Int. Cl.
- *H04L 1/00* (2006.01)
- *H04L 12/26* (2006.01)
- *H04W 4/00* (2009.01)
- *H04J 3/16* (2006.01)
- *H04J 3/22* (2006.01)

(52) U.S. Cl. .................. 370/235; 370/236; 370/328; 370/331; 370/470

(58) Field of Classification Search .............. 370/235, 370/236, 320, 328, 331, 335, 342, 470
See application file for complete search history.

(56) References Cited

U.S. PATENT DOCUMENTS

2004/0218559 A1  11/2004  Kim et al.

OTHER PUBLICATIONS

Unpublished U.S. Appl. No. 12/243,070 entitled "Variable Auxiliary Pilot Trigger and Performance" filed Oct. 1, 2008 in the name of Debasish Sarkar et al.
Unpublished U.S. Appl. No. 12/569,120, entitled "Enhanced Reverse Link Auxiliary Pilot Trigger" filed Sep. 29, 2009 in the name of Hemanth Pawar et al.
Unpublished U.S. Appl. No. 12/478,827, entitled "Reverse Noise Rise Based Payload Threshold Determination for Auxiliary Pilot Trigger" filed Jun. 5, 2009 in the name of Siddharth Oroskar et al.
Unpublished U.S. Appl. No. 12/634,818, entitled "Auxiliary Pilot Trigger Based On Latency" filed Dec. 10, 2009 in the name of Debasish Sarkar et al.

*Primary Examiner*—Ronald Abelson

(57) ABSTRACT

A method and system is disclosed for dynamic adjustment of threshold payload size for triggering an auxiliary pilot. An access terminal in a wireless communication system that includes a base station may operate in a state in which (i) the access terminal transmits a primary beacon signal on an air interface communication link to the base station, and, (ii) upon a condition that the access terminal will transmit a packet having a size larger than a threshold packet size, the access terminal activates and transmits a secondary beacon signal on the air interface communication link to the base station concurrently with transmission of the primary beacon signal. While operating in the state, upon receiving a first particular sequence of power-control commands from the base station, the access terminal will decrease the threshold packet size by a decremental amount. Also while operating in the state, upon receiving a second particular sequence of power-control commands from the base station, the access terminal will increase the threshold packet size by an incremental amount.

28 Claims, 7 Drawing Sheets

DYNAMIC PAYLOAD-SIZE THRESHOLD FOR TRIGGERING AN AUXILIARY PILOT

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennae. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Data on either link are encoded by the sender and decoded by the receiver. To facilitate decoding, the sender also transmits a beacon or "pilot" signal that, among other functions, provides the receiver with a timing reference for other signals transmitted by the sender. Under certain conditions, an AT can transmit on its reverse link a secondary beacon, or "auxiliary" pilot, that boosts the power of its "primary" pilot, and thereby enhances the precision and reliability of the base station's timing reference for the AT.

The access terminal switches its auxiliary pilot on and off in response to the size of the data payloads that the AT transmits in link-layer packets to its serving base station. More specifically, the size of a data payload corresponds to a volume of data transmitted per unit time, such that the larger the payload size, the higher the density of information per payload, and vice versa. As the payload size (and the density of information) increases, the precision and reliability of the base station's timing reference becomes more important to the base station's ability to correctly decode received data packets. In order to ensure a precise and reliable timing reference, the AT uses a threshold payload size to determine whether or not to trigger its auxiliary pilot, turning the auxiliary pilot on when the payloads of transmitted packets exceed the threshold size and turning it off when they are below threshold size.

In conventional operation, the threshold payload size is set in a system parameter that is disseminated to all AT operating in the wireless communication system. The value of the system parameter is determined, in part, according to various performance tradeoffs. A larger value will cause ATs to transmit larger payloads before triggering their auxiliary pilots. The result can be longer average battery life for the ATs, as well as less reverse link interference, but at the possible expense of higher decoding error rates of packets at the base stations. A smaller value will cause ATs to trigger their auxiliary pilots for smaller transmitted payload sizes. The result can be more reliable decoding of packets by the base stations, but at the possible expense of shorter average battery life for the ATs and more reverse link interference. Since the value of the threshold payload size parameter remains relatively fixed, possibly being adjusted only from time to time by the system operator, for example, the performance tradeoffs used in determining the value cannot take account of more immediate RF conditions that can vary dynamically in time and among ATs operating in the wireless communication system.

At the same time, control and management of each access terminal's transmission power does take account of dynamic RF conditions on each respective reverse link. In particular, as described in more detail below, the base station sends a continuous, periodic stream of power-control commands to each AT having an active communication session in order to adjust each AT's transmission power level in real-time response to each AT's operating environment. Identification of particular combinations of power-control commands sequentially received by an access terminal can therefore be advantageously used to indicate real-time operating conditions, and provides a basis for adjusting the threshold payload size in response to changing conditions. Accordingly, embodiments of the present invention advantageously provide dynamic adjustment of the payload size used to triggered operation of an auxiliary pilot in an access terminal.

Hence in one respect, various embodiments of the present invention provide, in an access terminal operating in a wireless communication system that includes a base station, a method comprising: operating in a state in which (i) the access terminal transmits a primary beacon signal on an air interface communication link to the base station, and, (ii) upon a condition that the access terminal will transmit a packet having a size larger than a threshold packet size, the access terminal activates and transmits a secondary beacon signal on the air interface communication link to the base station concurrently with transmission of the primary beacon signal; while operating in the state, upon receiving a first particular sequence of power-control commands from the base station, decreasing the threshold packet size by a decremental amount; and while operating in the state, upon receiving a second particular sequence of power-control commands from the base station, increasing the threshold packet size by an incremental amount.

In another respect, various embodiments of the present invention provide, in an access terminal operating in a wireless communication system that includes a base station, a method comprising: on an air interface communication link from the access terminal to the base station, transmitting a primary beacon signal to the base station; setting a threshold packet size based on receiving a particular sequence of power-control commands from the base station; and upon a condition that the access terminal will transmit a packet having a size larger than the threshold packet size, activating and transmitting a secondary beacon signal on the air interface communication link to the base station concurrently with transmission of the primary beacon signal.

In yet another respect, various embodiments of the present invention provide, in an access terminal operating in a wireless communication system that includes a base station, an improvement comprising: means for transmitting a primary beacon signal to the base station on an air interface communication link from the access terminal to the base station; means for setting a threshold packet size based on receiving a particular sequence of power-control commands from the base station; and means for, upon a condition that the access terminal will transmit a packet having a size larger than the threshold packet size, activating and transmitting a secondary beacon signal on the air interface communication link to the base station concurrently with transmission of the primary beacon signal.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-856 and IS-2000 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. It should be understood that the present invention can apply to other wireless voice and data protocols including, without limitation, IS-95 and GSM, which, together with IS-856 and IS-2000 are considered herein, individually or in combination, to comprise a CDMA family of protocols.

Figure 1:
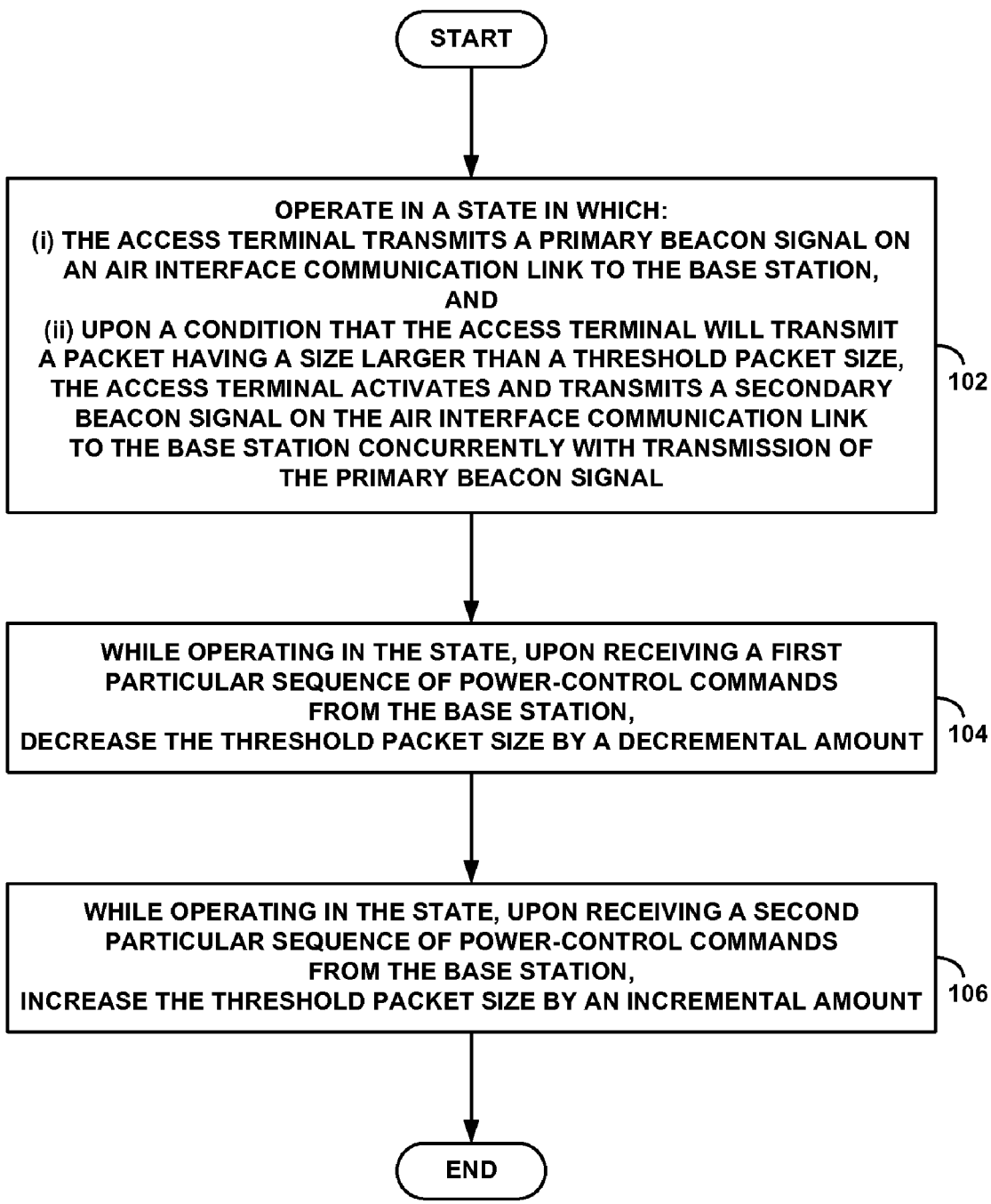
FIG. 1 is a flowchart illustrating an example embodiment of dynamic adjustment of threshold payload size for triggering an auxiliary pilot.

FIG. 1 is a flowchart illustrating an example embodiment of dynamic adjustment of threshold payload size for triggering an auxiliary pilot. By way of example, the steps of the flowchart could be implemented in an access terminal in a wireless communication system that includes a base station, and that operates according to a CDMA family of protocols. At step 102, the access terminal operates in a state in which it transmits a primary beacon signal on an air interface communication link to the base station, and in which, upon a condition that the access terminal will transmit a packet having a size larger than a threshold packet size, the access terminal activates and transmits a secondary beacon signal on the air interface communication link to the base station concurrently with transmission of the primary beacon signal. In accordance with the example embodiment, the state could be an "active state" in which the access terminal is engaged in a communication session or call via the base station. In such an active state, the AT's behavior as described in connection with step 102 helps maintain robustness of operation.

For an AT and base station operating according to IS-856, for instance, the primary beacon signal could be the primary pilot transmitted by the AT on its reverse link to the base station. The pilot signal of an AT is used by the AT's serving base station, among other purposes, to establish and maintain a timing reference for the AT, which then facilitates decoding by the base station of other signals sent to by the AT on its reverse link. In accordance with the present example embodiment, the secondary beacon signal could then be an auxiliary pilot. The auxiliary pilot is identical to the primary pilot, except that it is transmitted at a lower power level. Transmission of the auxiliary pilot therefore effectively boosts the power of the primary pilot as received by the base station. In so doing, the precision and reliability of base station's timing reference for the AT is enhanced, thereby enhancing the reliability of decoding of the AT's reverse-link signals. In practice, the power level of each of the primary and auxiliary pilot is specified as a gain level, x, according to the relation x dBm=10 $\log_{10}$(P/1 mW), where P is the power in mW (milliwatts). However, other power units could be used.

In further accordance with the example embodiment, the condition that the access terminal will transmit a packet having a size larger than a threshold packet size corresponds to a condition that the access terminal will transmit a packet having a payload size larger than a threshold payload size. Under IS-856 (and other CDMA-related protocols), the payload size on the reverse link corresponds to an amount of data transmitted per unit time (e.g., bits per second). The higher the amount of data per unit time (i.e., the larger the payload size), the more important the need for a precise and reliable timing reference at the base station. Hence, activating, or "triggering," the auxiliary pilot for payload sizes exceeding the threshold size helps ensure that the base station will have a precise and reliable timing reference when it needs it. In a wireless communication system that operates according to a CDMA family of protocols including IS-856, the threshold packet size corresponds to a value of a system parameter dubbed "AuxiliaryPilotChannelMinPayload." Accordingly, the threshold condition of step 102 could be based on a comparison of payload size to AuxiliaryPilotChannelMinPayload.

At step 104, while operating in the state described at step 102, upon receiving a first particular sequence of power-control commands from the base station, the access terminal decreases the threshold packet size by a decremental amount. In accordance with the example embodiment, power-control commands comprise power-increment commands and power-decrement commands. As described below, power-increment commands could be "power-up" commands sent from the base station according to inner loop power-control protocols of IS-856, and power-decrement commands could be "power-down" commands similarly sent from the base station according to inner loop power-control protocols. A base station sends power-control commands to an access terminal operating in an active state to control the AT's transmission power level on its reverse link to the base station, and the AT responds to each power-control command received in sequence by increasing or decreasing its transmission power level.

In accordance with the example embodiment, the first particular sequence of power-control commands is indicative of the base station's need for higher power from the access terminal. As such, the first particular sequence may reflect poor or deteriorating RF conditions, or other physical factors causing the base station to require sustained, increasing signal strength from the AT. Decreasing the threshold payload (or packet) size under such circumstances advantageously will cause the AT to trigger its auxiliary pilot for smaller payload sizes in response to the AT's poor or sub-optimal, real-time operating conditions.

In further accordance with the example embodiment and the first particular sequence being indicative of poor or sub-optimal, real-time operating conditions for the access terminal, the first particular sequence of power-control commands could be a first particular number of consecutive power-increment commands. For instance, the first particular sequence could be five consecutive power-up commands. Since the AT responds in sequence to each received power-up command by increasing its transmission power, every successive power-up command indicates that the power increase responsive to the preceding power-up command was insufficient to satisfy the base station's needs. Hence, five (or some other number of) consecutive power-up commands can be taken as indicative of poor or sub-optimal operating conditions for the access terminal.

As an alternative to consecutive power-increment commands, the first particular sequence could be a sequence of both power-increment and power-decrement commands such that the AT's response to all of the commands in the sequence results in a net increase to transmission power that exceeds a threshold amount of increased power. For example, if the threshold amount of increased power is taken to be 4 dB within a span of a five-command sequence, then any combination within a sequence of five commands of power-up and power-down commands that yields at least a 4 dB increase in transmission power would meet the power-increase threshold requirements of the first particular sequence.

Finally, as step 106, while operating in the state described at step 102, upon receiving a second particular sequence of power-control commands from the base station, the access terminal increases the threshold packet size by an incremental amount. In accordance with the example embodiment, the second particular sequence of power-control commands is indicates that the base station is receiving from the access terminal a stronger signal than it needs. As such, the second particular sequence may reflect good or improving RF conditions, or other physical factors causing the base station to request sustained, decreasing signal strength from the AT. Increasing the threshold payload (or packet) size under such circumstances advantageously will cause the AT to trigger its auxiliary pilot for larger payload sizes in response to the AT's good or optimal, real-time operating conditions.

In further accordance with the example embodiment and the second particular sequence being indicative of good or optimal, real-time operating conditions for the access terminal, the second particular sequence of power-control commands could be a second particular number of consecutive power-decrement commands. For instance, the second particular sequence could be five consecutive power-down commands. Since the AT responds in sequence to each received power-down command by decreasing its transmission power, every successive power-down command indicates that the power decrease responsive to the preceding power-down command still left the base station with a signal strength in excess of its needs. Hence, five (or some other number of) consecutive power-down commands can be taken as indicative good or optimal operating conditions for the access terminal.

As an alternative to consecutive power-decrement commands, the second particular sequence could be a sequence of both power-increment and power-decrement commands such that the AT's response to all commands in the sequence results in a net decrease to transmission power that exceeds a threshold amount of decreased power. For example, if the threshold amount of decreased power is taken to be −4 dB within a span of a five-command sequence, then any combination within a sequence of five commands of power-up and power-down commands that yields at least a 4 dB decrease in transmission power would meet the power-decrease threshold requirements of the second particular sequence.

In further accordance with the example embodiment, the access terminal decreases the threshold packet size at step 104 by a decremental amount based on a current value of the threshold packet size, wherein the current value is the value of the threshold packet size prior to the access terminal receiving the first particular sequence. For example, if the first particular sequence of power-control commands is defined as five consecutive power-up commands, then the value of the threshold packet size prior to receiving all five power-up commands is the current value. In other words, the current value is the value that will be decreased upon receiving the entire first particular sequence, and the amount of the decrease depends on the current value.

As an example of decreasing the threshold packet size by an amount based on the current value of the threshold, the AT could maintain a table of distinct values arranged in increasing order from a minimum value to a maximum value. Such table could be stored in the AT's physical memory (e.g., solid state memory). The current value would be one of the distinct values, and decreasing the threshold packet size by an amount based on the current value could then comprise the AT setting the threshold to the next smaller value in the table ahead of the current value if the current value is not the minimum value. If the current value is the minimum value, then the AT could leave the current value unchanged, effectively decreasing the current value by zero in this case. As an alternative to using the table, the AT could decrease the threshold packet size as a function of the current value, again setting a lower limit to a minimum size.

Similarly to decreasing the threshold packet size based on a current value, the access terminal increases the threshold packet size at step 106 by an incremental amount based on a current value of the threshold packet size, the current value in this instance being the value of the threshold packet size prior to the access terminal receiving the second particular sequence. For example, if the second particular sequence of power-control commands is defined as five consecutive power-down commands, then the value of the threshold packet size prior to receiving all five power-down commands is the current value. In this instance, the current value is the value that will be increased upon receiving the entire second particular sequence, and the amount of the increase depends on the current value. Note that the current value prior to receiving the second sequence need not be the same as the current value prior to receiving the first sequence (although this is not excluded).

As an example of increasing the threshold packet size by an amount based on the current value of the threshold, the AT could use the same table of distinct values as used for decreasing the threshold packet size. Again, the current value would be one of the distinct values, and increasing the threshold packet size by an amount based on the current value could then comprise the AT setting the threshold to the next larger value in the table after of the current value if the current value is not the maximum value. If the current value is the maximum value, then the AT could leave the current value unchanged, effectively increasing the current value by zero in this case. As an alternative to using the table, the AT could increase the threshold packet size as a function of the current value, in this instance setting an upper limit to a maximum size.

By dynamically adjusting the threshold packet size in response to receiving particular sequences of power-control commands, the access terminal advantageously adapts the triggering of its auxiliary pilot to its operating conditions. Each of multiple access terminals can carry out this method independently, so that each can adapt to its own operating conditions, thereby advantageously improving overall system performance. In a wireless communication system that operates according to IS-856, a system-wide value of AuxiliaryPilotChannelMinPayload may still be used. However, those ATs that implement the method of the example embodiment (or an alternative embodiment) will each incorporate their own, dynamic value of the threshold.

It should be understood that the designation of steps 104 and 106 in numerical order in the flowchart in FIG. 1 is made for the convenience of the discussion herein. That is, each of steps 104 and 106 describe actions taken by the access terminal upon specific, respective conditions that may occur while the access terminal is operating in the state described at step 102. The specific respective conditions are receipt by the AT of the first particular sequence of power-control commands (step 104), or receipt by the AT of the second particular sequence of power-control commands (step 106). As such, the numbering of steps 104 and 106 should not be taken as specifying or implying a relative, temporal ordering. Rather, in any particular circumstance in which the AT is operating in the state described at step 102, either or both or neither of steps 104 and 106 will be carried out depending on whether either or both or neither of the specific, respective conditions occur. Moreover, the occurrence of one of the specific conditions could repeat, such that the corresponding actions would also repeat.

In the discussion of FIG. 1, as well as in other discussions and explanations herein, the terms "first" and "second" as applied to "particular sequences," "thresholds," "particular number numbers," and the like, are used as identifying labels, and not meant to imply any numerical ordering (although a numerical ordering is not necessarily excluded). Additionally, reference herein to sequences of power-control commands should be understood to define groupings of temporally sequenced power-control commands. For example, "receiving a sequence of power-control commands" should be taken to mean receiving all of the power-control commands of the sequence one command after the other in time.

It will also be appreciated that the steps of FIG. 1 are exemplary, and that additional and/or alternative steps or alternative ordering of steps could be carried out and still remain within the scope and spirit of the present invention.

Figure 2:
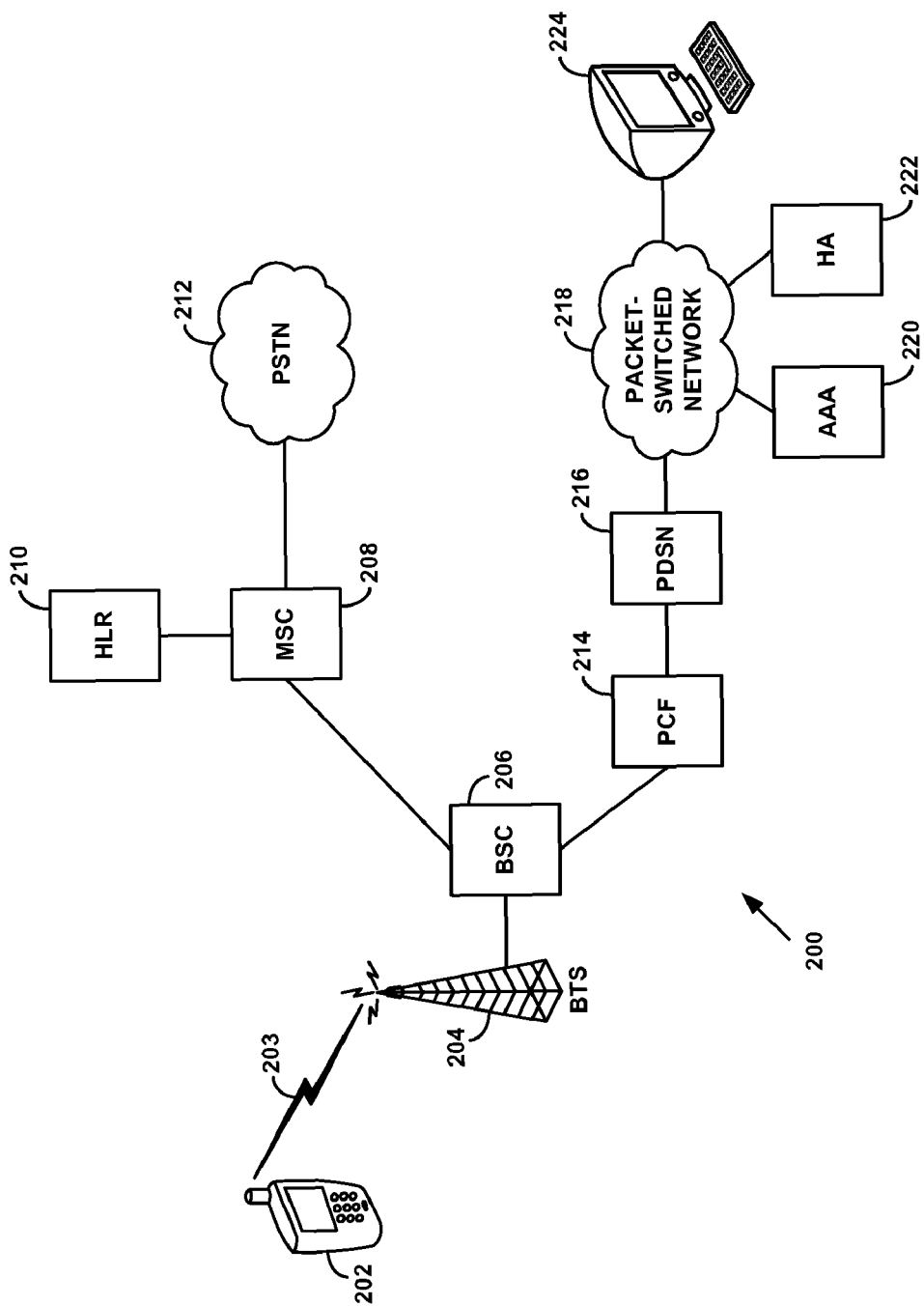
FIG. 2 is a simplified block diagram of a wireless communication system in which an example embodiment of dynamic adjustment of threshold payload size for triggering an auxiliary pilot can be employed.

FIG. 2 shows a simplified block diagram of a wireless communication system 200 in which an example embodiment of dynamic adjustment of threshold payload size for triggering an auxiliary pilot can be employed. Access terminal AT 202 communicates over an air interface 203 with a BTS 204, which is then coupled or integrated with a BSC 206. Transmissions over air interface 203 from BTS 204 to AT 202 represent the forward link to the access terminal (also referred to herein alternatively as the forward link from the base station, and as "the AT's forward link"). Transmissions over interface 203 from AT 202 to BTS 204 represent the "reverse link" (also referred to herein as "the AT's reverse link") It will be appreciated that the arrangement shown in the figure is illustrative.

BSC 206 is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs or other telephony circuit switches in the operator's (or in a different operator's) network, thereby supporting user mobility across MSC regions, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a transceiver, a communication interface, a tone detector, a processing unit, and data storage, all of which may be coupled together by a system bus or other mechanism. As such, system 200, AT 202, and air interface 203 are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Data sent on both the forward and reverse links are first assembled into units called frames, which are then encoded for transmission to or from the access terminal at regular intervals (corresponding to a frame rate), typically 20 milliseconds in duration (although other frame intervals can be used). As a result of imperfect transmission, some frames received by the AT on the forward link or by the base station on the reverse link may contain errors. Other frames—ideally, the majority of them—will be received without errors. It may also be possible through one or another coding technique to correct certain errors in frames.

On either link, the receiving entity (e.g., AT or base station) can compute a ratio of (i) the number of error-containing frames received during a given period of time to (ii) the total number of frames received during the same period of time. This ratio, computed by the AT on the forward link and by the base station on the reverse link, is called the frame error rate (FER). The FER is an indicator of the RF conditions of the forward and/or reverse link, and consequently the quality service provided over the respective link. For instance, frame errors may manifest as lost audio samples, which in turn cause choppy or distorted audio output when played out by a receiving device. Similarly, frame errors may represent packet-data loss that results in retransmissions and lower overall throughput. In general, the higher the FER, the lower the quality of service will be, and vice versa. For a given set of physical conditions underlying communications between a base station and an access terminal, the higher the transmission power on the link (forward or reverse), the lower the FER will be. Consequently, the quality of service provided on a link can be adjusted and/or controlled by adjusting the transmission power used on the link.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In practice, similar methods of power control are implemented on both the forward and reverse links. For each link, two interrelated schemes are employed. The first, called "inner-loop" power control, achieves rapid convergence of link power to a level corresponding to a threshold signal-to-noise ratio (SNR). The second, called "outer-loop" power control, operates on a much longer time scale (i.e., more slowly) than the inner loop, and adjusts the inner-loop threshold SNR in response to the computed FER. Thus the outer loop adjusts the SNR threshold to attain a desired quality of service (as measured by FER), while the inner loop adjusts the link power to quickly achieve (at least approximately) the SNR threshold set by the outer loop. In accordance with the discussion above, further details of power control will be described with reference only the reverse link. However, it should be understood that, except for switching operational roles of an access terminal and a base station (i.e., roles with respect to sending and responding to power-control commands described below), the basic principles apply to the forward link as well.

More specifically, for inner-loop power control, the base station measures (for each reverse link) SNR at a rate of 800 times per second (although other rates are possible), each SNR measurement being made in terms of $E_b/N_0$, where $E_b$ is the energy per bit of the signal received by the AT and the $N_0$ is the noise power spectral density. For each measurement, the base station compares $E_b/N_0$ with a threshold value called $(E_b/N_0)_{setpoint}$ and responsively sets and sends a power control bit to the AT in order to affect a power adjustment. In practice, power adjustment is applied in terms of gain relative to a current power level, and measured in dB. For $E_b/N_0 \leq (E_b/N_0)$ the base station sets the power control bit to "power up," and the AT setpoint, responsively increases the reverse link gain by a small amount (typically 1 dB or less). For $E_b/N_0 > (E_b/N_0)_{setpoint}$, the base station sets the power control bit to "power down," and the AT responsively decreases the reverse link gain by the same small amount. In this manner, the reverse link power rapidly converges, in small increments or decrements, to a level where $E_b/N_0 \approx (E_b/N_0)_{setpoint}$, and thereafter hovers about $(E_b/N_0)_{setpoint}$ until $(E_b/N_0)_{setpoint}$ is adjusted to a new value by outer-loop power control. Each transmission by the base station of the power control bit set to power up is commonly referred to as a "power-up command." Similarly, each transmission of the power control bit set to power down is referred to as a "power-down command."

For outer-loop power control on the reverse link, the base station computes the FER in consecutive windows, each being an integer number of frames in duration. Thus, in each window, FER may be expressed as the number of frames with errors divided by the number of frames per window. Typically, the duration of a window is 20 frames, although other window sizes (number of frames per window) could be used. For each window, the base station compares the computed FER with a reverse-link Target FER (TFER). If the computed FER is less than TFER, the base station decreases $(E_b/N_0)_{setpoint}$. Conversely, if the computed FER is greater than TFER, the base station increases $(E_b/N_0)_{setpoint}$. In this manner, a computed FER that exceeds the target FER drives the inner-loop power control to increase the reverse-link power, while a computed FER that is below the target FER drives the inner-loop power control to decrease the reverse-link power.

In the context of a CDMA family of protocols, the power control methods described in the preceding are sometime referred to as "inner-loop power-control protocols" and "outer-loop power-control protocols." It should also be noted that additional or alternative methods of power control may be applied to either of the forward or reverse links.

With arrangement described above, an access terminal can engage in cellular voice or packet-data communications. Referring again to FIG. 2, and taking an originating call from AT 202 as an example, AT 202 first sends an origination request over air interface 203 and via the BTS 204 and BSC 206 to MSC 208. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, the BTS of a serving sector transmits to all its active ATs on a common forward link, using time division multiplexing (TDM) to distinguish transmissions among the recipient ATs. Each transmission is made at the full power of the sector, thereby optimizing the achievable signal-to-noise characteristics. As a result of the full-power allocation by the sector, an access terminal operating under IS-856 can, in theory, receive packet-data at a rate of at least 38.4 kbps and up to 2.4 Mbps on its forward link. The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset.

The IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include a pilot that serves as beacon signal for identifying the AT to the RAN and for establishing and maintaining a timing reference for decoding other signals received at the RAN from the AT.

In operation, each AT with an active data session in a given sector encodes reverse-link traffic-channel data using the same PN long code but with an AT-specific long-code mask. Each AT also transmits its pilot signal, which consists of all zeros encoded with a PN short code of zero and further encoded using an AT-specific long-code mask. ATs having active sessions with a given serving base station (or in a given sector) can transmit concurrently, so the serving base station receives a signal that is generally the superposition of transmissions from multiple ATs. The serving base station knows the long-code mask of each served AT with an active data session, and uses the mask to sort out each AT's pilot signal in order establish and maintain that AT's timing reference. A base station's timing reference for a given AT is essentially a synchronization with the AT's chips. Once the base station establishes synchronization, it can apply the AT's long-code mask to sort out data received from that AT and decode the data on a chip-by-chip basis. The pilot is transmitted nearly continuously during every 2,048-chip timeslot, allowing the base station to continuously update its timing reference for the AT as the AT moves about in the sector, or as other factors cause the AT's operational RF conditions to change.

Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000. In particular, for each active AT in a sector, the serving base station uses a calculated frame error rate to set an outer-loop SNR threshold (i.e., the $(E_b/N_0)_{setpoint}$), and, in accordance with inner-loop power control protocols, issues appropriate power-control commands—power-up or power-down commands—to cause the $E_b/N_0$ of the signal received from the AT to converge to the threshold. As described in detail below, an auxiliary pilot signal added to Rev. A of IS-856 can be triggered in according to a threshold payload size that is advantageously dynamically adjusted in response to power-control commands from a base station, thereby efficiently adapting triggering to the access terminal's current RF conditions.

Operation in an IS-856 compliant communication system may be illustrated, again with reference to FIG. 2. To acquire packet data connectivity under IS-856, after an access terminal first detects an IS-856 carrier, the access terminal sends to its BSC (or RNC) 206 a UATI (Universal Access Terminal Identifier) request, and receives in response an UATI, which the access terminal can then use to identify itself in subsequent communications with the BSC. The access terminal then sends a connection-request to the BSC 206, and the BSC responsively invokes a process to authenticate the access terminal and to have the access terminal acquire a data link.

In particular, the BSC 206 sends an access request to an Access Network AAA (ANAAA) server (which may be different than the AAA server 220), and the ANAAA server authenticates the access terminal. The BSC 206 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode (or state). In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. AUXILIARY PILOT TRIGGER a. Operating Principles

As described above, under IS-856 the reverse link consists of an access channel and a traffic channel. The traffic channel is further subdivided into a pilot channel, a MAC channel, and ACK channel and a data channel. The MAC channel further includes a reverse rate indicator (RRI) channel and a DRC channel. The transmission power applied to each of these channels is tied (or linked) to that of the pilot channel. In responding to inner-loop power-control commands from a serving base station, an access terminal adjusts the power of its pilot signal (i.e., the gain applied to its pilot channel). At the same time, the power applied to each of the other channels is scaled in relation to the pilot signal, such that the relative gain of each channel with respect to that of the pilot channel is kept fixed. For example, in typical operation, the reverse ACK channel is transmitted at 3 dB higher than the pilot channel (twice the pilot signal power), the RRI channel is transmitted at the same gain as the pilot channel (same power as the pilot signal), and the data channel is transmitted 3 dB lower (½ the pilot signal power). Note that using a fixed gain factor with respect to the gain of the pilot channel is equivalent to using a fixed power ratio with respect to the power of the pilot channel.

The data rate achievable on the reverse link depends on a combination of factors, including noise characteristics of the reverse link as reported to the AT by the base station, the amount of data to be sent by the AT, and the amount of reverse-link power the AT has to spare ("head room"). In turn, the data rate will be used to determine the size of the payload of link-layer packets sent from the AT to the base station. A higher achievable data rate supports higher-density coding, and hence more data symbols per frame and a correspondingly larger payload size. Conversely, a smaller data rate accommodates lower-density coding and thus a smaller payload size.

The ability of the base station to correctly decode a packet received from a given AT depends on the quality and reliability of the base station's timing reference for the AT, which, in turn, depends (at least in part) on the strength of the AT's pilot signal. In particular, as payload size grows with the data rate of an AT's reverse-link data channel, the importance of a reliable timing reference for that AT at the serving base station correspondingly increases. To help ensure the requisite reliability, Rev. A of the IS-856 standard introduced an "auxiliary pilot" signal that an AT turns on and off according to the payload size that the AT transmits on its reverse-link data channel. Specifically, in conventional operation under IS-856, Rev. A, a system-wide threshold of payload size is set according to a single, system-wide parameter called "AuxiliaryPilotChannelMinPayload" such that an access terminal will turn on its auxiliary pilot whenever the AT starts transmitting link-layer packets with payloads at least as large as the threshold. The AT will subsequently turn off its auxiliary pilot if the payload size drops below the threshold. With the introduction of the auxiliary pilot, the nominal pilot is redesignated as the "primary pilot" signal (or channel).

When switched on, an AT's auxiliary pilot is conventionally transmitted at a fixed gain below that of the primary pilot, typically at −9 dB with respect to the gain of the primary pilot (although other values could be used). Except for the reduced power level with respect to the primary, however, the auxiliary pilot is identical the primary, being encoded with the same PN long-code mask. Thus, the primary and auxiliary pilots are effectively additive to a single pilot signal that is identical to either one of them but having their combined transmission power. From the perspective of the serving the base station, the AT appears to be transmitting a stronger pilot signal when its auxiliary pilot is switched on. In turn, the base station's timing reference for the AT is made more precise and reliable.

b. Dynamic Adjustment of Threshold Payload Size

While use of a threshold packet size to determine whether or not an AT should switch its auxiliary pilot on or off can help ensure reliable decoding of data by the base station, the relative benefits of the auxiliary pilot also depend on proper setting of the threshold. For example, if AuxiliaryPilotChannelMinPayload is set too high, then an AT may transmit many packets with payloads too large to be reliably decoded by the serving base station in the absence of the AT's auxiliary pilot and its enhancement to the base station's timing reference for the AT. In this case, packet error rates may increase. Conversely, if AuxiliaryPilotChannelMinPayload is set too low, then an AT may switch on its auxiliary pilot for transmissions of many packets with payloads that can be decoded by the base station even in the absence of the auxiliary pilot signal. In this case, the AT will needlessly consume additional battery power by transmitting the auxiliary pilot at times when it is not needed. Unneeded transmission of the AT's auxiliary pilot will also contribute unnecessarily to general noise and interference on the reverse link in the serving sector. Thus, appropriate setting of the system-wide threshold for packet size involves evaluation of tradeoffs exemplified above, among other possible factors.

The challenge of appropriately setting the threshold payload size arises, at least in part, because the factors that go into balancing the tradeoffs that need to be considered are dynamic. In particular, relying on a fixed threshold payload size to control use of the auxiliary pilot does not take account of the immediate RF conditions under which the AT is operating. By contrast, the inner-loop power-control protocols described above are designed for rapid response to the dynamic quality of an AT's reverse link, and hence the continuous stream of power commands from the serving base station provides a good indicator of the immediate RF conditions on an AT's reverse link. Accordingly, embodiments of the present invention use the inner-loop power control commands received at an AT from its serving base station to dynamically adjust the value of the threshold payload size.

In accordance with an example embodiment, an access terminal that is operating in an active state—i.e., a state in which the AT switches its auxiliary pilot on and off according to comparison of the payload sizes of transmitted packets to a threshold payload size—will respond to reception of a first particular sequence of power-control commands by decreasing the threshold payload size, and will respond to reception of a second particular sequence of power-control commands by increasing the threshold payload size. More specifically, the first particular sequence of power-control commands is defined so as to be indicative of operating conditions that warrant more "aggressive" triggering of the auxiliary pilot (i.e., for smaller payload sizes). Thus upon reception at the access terminal of the first particular sequence of power-control commands while the AT is in an active state, the AT will decrease the threshold payload size. Conversely, the second particular sequence of power-control commands is defined so as to be indicative of operating conditions that warrant less aggressive triggering of the auxiliary pilot (i.e., for larger payload sizes). Thus upon reception at the access terminal of the second particular sequence of power-control commands while the AT is in an active state, the AT will increase the threshold payload size.

Since the first and second particular sequences are indicative of the AT's operating conditions, which in turn are dynamic, reception of the sequences while the AT is in an active state can occur in any order, and reception of either sequence can occur more than once, multiple times in a row, or not at all. Correspondingly, the AT will dynamically adjust its threshold payload size in any number and ordering of decrements and increments depending on received power-control commands.

Because the AT adjusts the transmission power on its air interface for each power-control command received from the base station, and because the base station issues each subsequent power-control command after assessing the AT's adjustment of reverse-link signal strength responsive to the preceding power-control command, a sequence of power-control commands all of the same type indicates the base station's need for sustained upward or sustained downward adjustments by the AT. A sequence of consecutive power-up commands can therefore be indicative of poor or sub-optimal operating conditions. Conversely, a sequence of consecutive power-down commands can be indicative of good or optimal operating conditions. In accordance with the example embodiment, then, the first particular sequence of power-control commands is defined as a first particular number of consecutive power-up commands. The first particular number could be five, for instance, although other numbers could be specified as well. Similarly, the second particular sequence of power-control commands is defined as a second particular number of consecutive power-down commands. The second particular number could also be five, although other numbers could be specified as well. Further, the first and second particular numbers need not be the same.

As an alternative to reception of a consecutive number of the same type of power-control commands, the first and second particular sequences could be defined according to a threshold amount of power adjustment resulting from the AT's response to one or the other sequence of power-control commands. More particularly, the first particular sequence of power-control commands could be defined as a sequence of a first particular number of mixed power-up and power-down commands such that the AT's response to all of the commands of the sequence yields a net increase in transmission power that exceeds a threshold amount of increased power. Similarly, the second particular sequence of power-control commands could be defined as a sequence of a second particular number of mixed power-up and power-down commands such that the AT's response to all of the commands of the sequence yields a net decrease in transmission power that exceeds a threshold amount of decreased power.

For the alternative forms of the first and second particular sequences, the first and second particular numbers could again be five, although other values could be specified, and the first and second particular number could be the same or different. By way of example, the threshold amounts of increased or decreased power could be 4 dB with respect to (i.e., above or below) the power just before reception of the first command of either the first or second particular sequence. For instance, a net adjustment of +5 dB with respect to transmission gain just prior to receiving the first power-control command of the first particular sequence would satisfy the threshold increase condition. Similarly, a net adjustment of −5 dB with respect to transmission gain just prior to receiving the first power-control command of the second particular sequence would satisfy the threshold decrease condition.

In further accordance with the example embodiment, the access terminal will adjust the threshold payload size upward or downward by an amount that is based on the current value of the threshold. The current value of the threshold is the value prior to the AT receiving the first particular sequence or the second particular sequence; i.e., the current value is the value of the threshold when the AT determines that the threshold is to be adjusted. The AT can base the adjustment on the current value by selecting a new value from a table of values. For instance, the AT can maintain in its memory a table of values arranged in increasing order from a minimum value to a maximum value. The current value would then be one of the values in the table, and the AT would decrease the value of the threshold payload size by selecting the next smaller value in the table relative to the current value. Similarly, the AT would increase the value of the threshold payload size by selecting the next larger value in the table relative to the current value. If the current value were already the minimum (or maximum) value, then the AT would not make any further adjustment downward (or upward).

Under IS-856, the system parameter AuxiliaryPilotChannelMinPayload that designates the threshold payload size used in conventional operation described above is typically specified to be one of the values in the list {128, 256, 512, 768, 1,024, 1,536, 3,072, 4,096, 6,144, 8,192, 12,288}, in units of bits. As described above, conventional operation employs a single, system-wide value of AuxiliaryPilotChannelMinPayload that is used by all ATs, and that is not adjusted dynamically, but rather may be changed from time to time by a system operator. In accordance with the example embodiment of dynamic adjustment of the threshold payload size, the values in the table used by the AT could be the same as those in the list of values used for AuxiliaryPilotChannelMinPayload, although other table values could be specified as well. Consequently, the threshold payload size used in embodiments of the present invention can be referred to as AuxiliaryPilotChannelMinPayload, with the understanding that as used in embodiments of the present invention AuxiliaryPilotChannelMinPayload is dynamically adjustable.

By dynamically adjusting the threshold payload size in response to receiving power-control command sequences that are indicative of the AT's operating conditions, the AT advantageously tunes triggering of its auxiliary pilot to its operating conditions. Further, by implementing dynamic adjustment on a per-AT basis, overall system performance is improved, as each AT can independently tune the sensitivity of its auxiliary pilot trigger to its own, individual operating circumstances.

c. Example Operation

Figure 3:
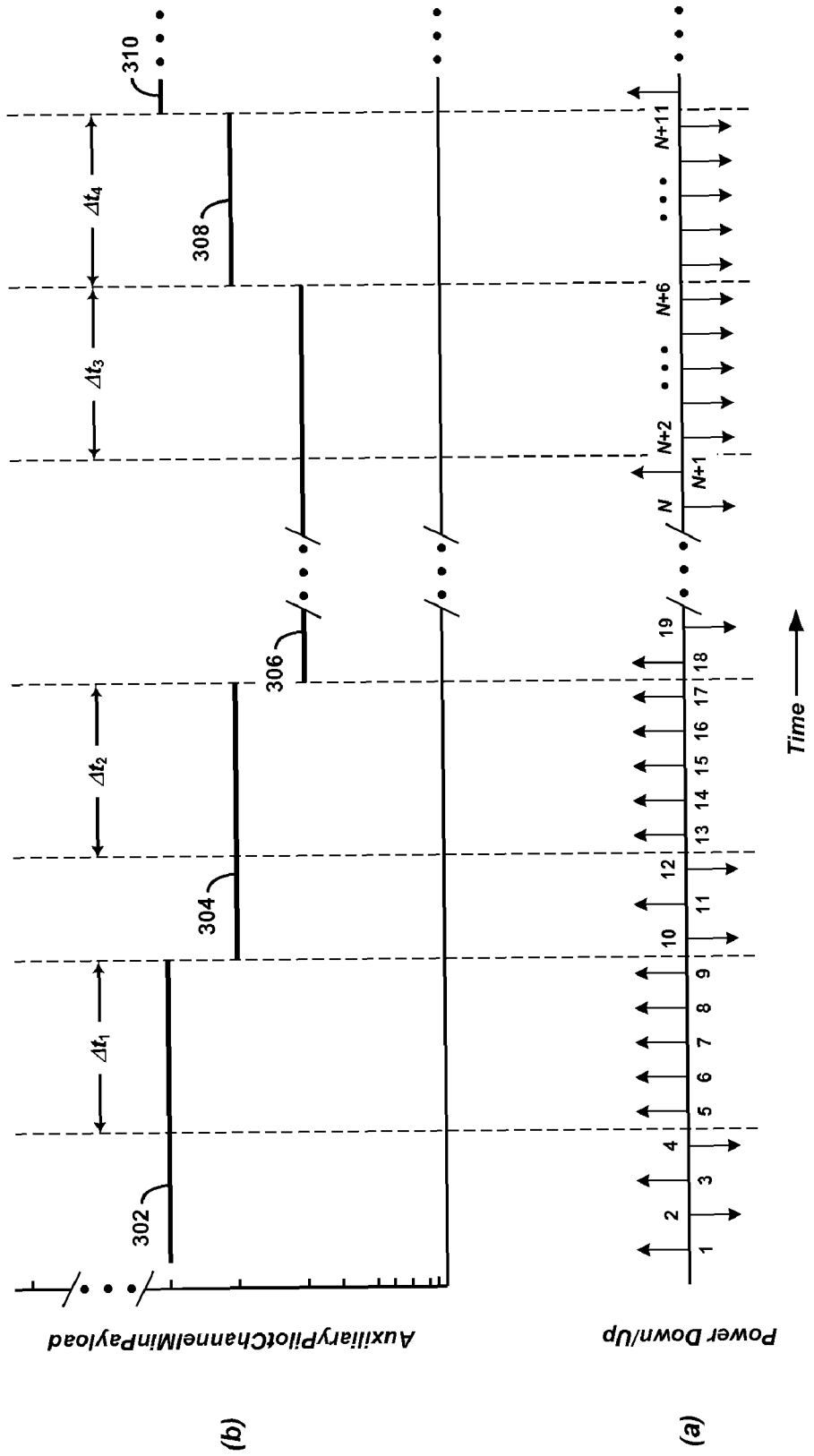
FIG. 3 illustrates an example of operation of dynamic adjustment of threshold payload size for triggering an auxiliary pilot for a use case of an example sequence of power-control commands, wherein dynamic adjustment is based on consecutive power-up and/or consecutive power-down commands.

FIG. 3 illustrates the operation of dynamic adjustment of threshold payload size for an example stream of received power-control commands, for the embodiment in which the first and second particular sequences of power-control commands are first and second numbers of consecutive power-up and power-down commands, respectively. By way of example, both the first and second particular numbers are taken to be five, although other values could be specified, and the two numbers need not be the same. The figure includes two horizontal panels, labeled (from bottom to top) "(a)" and "(b)." Panel (a) shows a timeline of power-control commands received by an AT; the upward arrows represent power-up commands and the down-ward arrows represent power-down commands. Each command has an associated numerical label above or below for purposes of the discussion herein. As indicated, time increases toward the right side of the panel, as do the numbers that label each command. Note that some power-control command numerical labels are represented implicitly by ellipses, but their intended values are readily determined by inspection.

Panel (b) depicts the value of the threshold payload size, wherein the threshold is designated AuxiliaryPilotChannelMinPayload. The horizontal axis corresponds to the same timeline as the power-control timeline in panel (a), and the vertical axis corresponds to the threshold value. As a function of time, five specific values 302, 304, 306, 308, and 310 set by the access terminal are shown.

Also shown for purposes of illustration are four time intervals, $\Delta t_1$, $\Delta t_2$, $\Delta t_3$ and $\Delta t_3$, demarked by dashed vertical lines that intersect both panels of the figure. As explained below, one particular sequence of power-control commands is received by the AT in each of these time intervals, and the AT responds by adjusting the value of the threshold payload size.

Initially (at the left side of the figure), the threshold payload size is set to an initial value 302. By way of example, the values could be specified from the list described above, and the initial value could be 6,144 bits. In the context of the present illustration the specific initial value is arbitrary, however, and the threshold could have a different initial value. Power-control commands 1, 2, 3, and 4 are evidently four alternating power-up and power-down commands. As indicated, time interval $\Delta t_1$ begins between power-control commands #4 (a power-down command) and #5 (a power-up command), and ends between power-control commands #9 (a power-up command) and #10 (a power-down command). Evidently, during $\Delta t_1$, five consecutive power-up commands (5, 6, 7, 8, 9) are received, thus corresponding to reception by the AT of an instance of the first particular sequence of power-control commands. Having received the first particular sequence of power-control commands, the AT decreases the value of the threshold payload size after $\Delta t_1$ to a new value 304. Again taking values from the list, the new value could be 4,096 bits.

Power control commands 10, 11, and 12, evidently three alternating power-down and power-up commands, are then received. Next, during time interval $\Delta t_2$, which begins between power-control commands #12 (a power-down command) and #13 (a power-up command) and ends between power-control commands #17 (a power-up command) and #18 (a power-up command), another sequence of five consecutive power-up commands is received at the access terminal. This corresponds to a second instance of the first particular sequence of power-control commands. Thus, the AT again decreases the value of the threshold payload size, this time after $\Delta t_2$ to a new value 306. Again taking values from the list, the new value could be 3,072 bits.

The timeline continues beyond power-control command #19 by an arbitrary amount of time, as represented implicitly by hash marks with intervening ellipses, and picks up again explicitly at power-control command N. As indicated, payload threshold value 306 is still in effect. Time interval $\Delta t_3$ then begins between power-control commands N+1 (a power-up command) and N+2 (a power-down command) and ends between power-control commands N+6 (a power-down command) and N+7 (a power-down command). During $\Delta t_3$, five consecutive power-down commands are received, corresponding to a first instance of the second particular sequence of power-control commands. The access terminal then responds by increasing the threshold payload size to a new value 308 at the end of $\Delta t_3$. Once more taking values from the list, the new value could be 4,096 bits.

Finally, time interval $\Delta t_4$ begins coincident with the end of $\Delta t_3$, and continues until a time between power-control commands N+11 (a power-down command) and N+12 (a power-up command). During $\Delta t_4$, five consecutive power-down commands are again received, corresponding to a second instance of the second particular sequence of power-control commands. Consequently, the access terminal again responds by increasing the threshold payload size, this time to a new value 310 at the end of $\Delta t_4$. The new value could be 6,144 bits, where the value is again selected from the table.

The example operation depicted in FIG. 3 illustrates that instances of reception by the AT of the first and second particular sequences of power-control commands can occur in arbitrary multiplicity and arbitrary order. In the present illustration, two instances of the first particular sequences occur nearly one after the other (just three power-control commands separate the instances), and two instances of the second particular sequence occur directly one after the other. The AT responds to each instance by appropriately adjusting (downward or upward) the value of the threshold payload size (AuxiliaryPilotChannelMinPayload).

Figure 4:
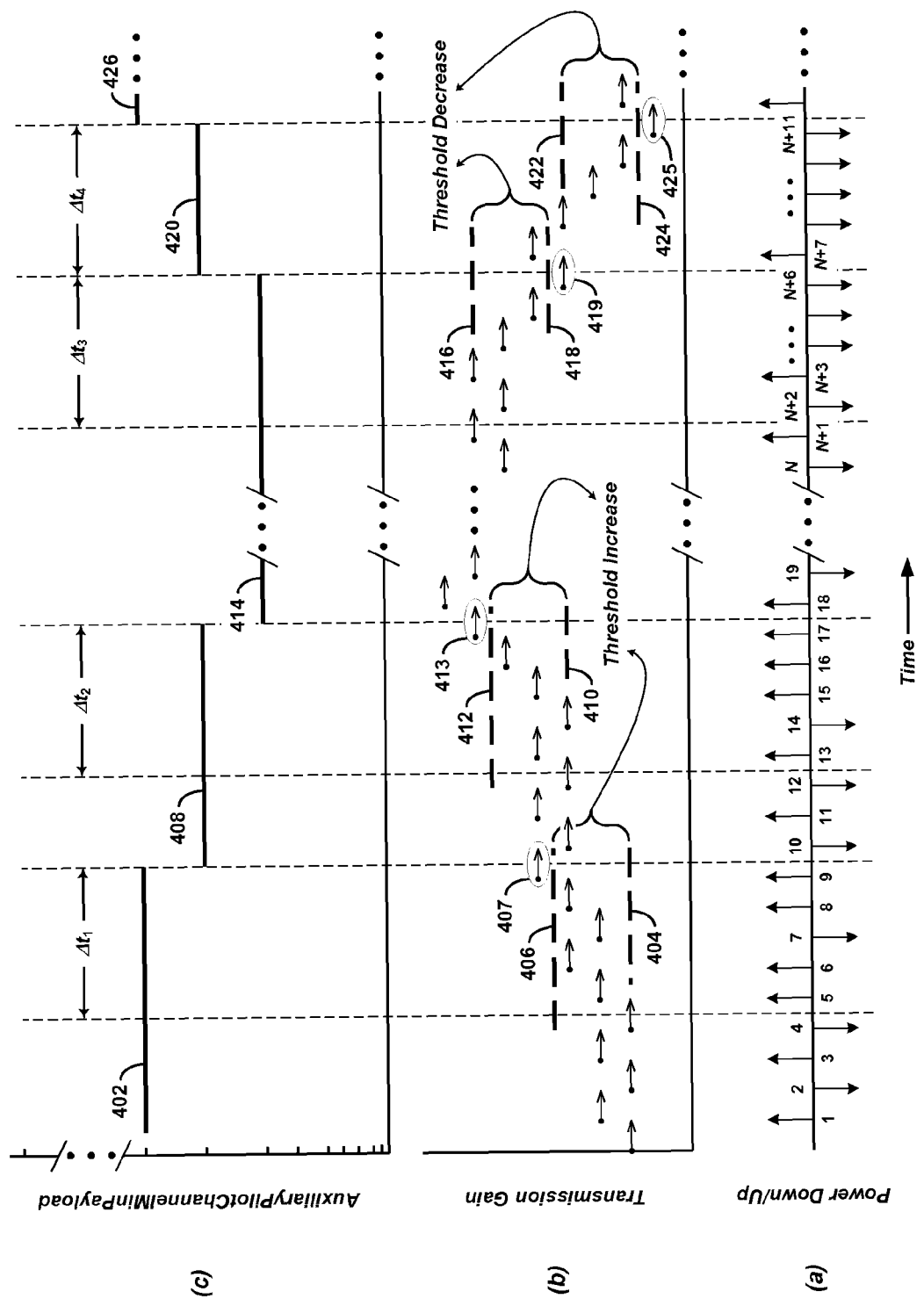
FIG. 4 illustrates an example of operation of dynamic adjustment of threshold payload size for triggering an auxiliary pilot for a use case of an example sequence of power-control commands, wherein dynamic adjustment is based on threshold power increases and/or threshold power decreases.

FIG. 4 illustrates the operation of dynamic adjustment of threshold payload size for an example stream of received power-control commands, for the embodiment in which the first and second particular sequences of power-control commands incorporate thresholds of transmission power adjustment. The figure includes three horizontal panels, labeled (from bottom to top) "(a)," "(b)," and "(c)." Panels (a) and (c) correspond to panels (a) and (b), respectively, in FIG. 3. Again, time increases toward the right side of the panel. The same four time intervals shown in FIG. 3 are depicted again in FIG. 4. Note that the stream of power-control commands in FIG. 4 (panel (a)) is not identical to that shown in FIG. 3.

Panel (b) in FIG. 4 shows transmission power on the AT's air interface specified as "Transmission Gain." The gain after the AT responds to each received power-control command is represented by a short, rightward-directed, horizontal arrow. The dot at the left each arrow is time-aligned with the particular received power-control command that caused the AT to make the adjustment. By way of example, the adjustment made in response to each power-up command is taken to be 1 dB up, and the adjustment made in response to each power-down command is taken to be 1 dB down. However, other amounts of adjustment could be made in response to the commands. The exact scale of the Transmission Gain axis is arbitrary in this illustration.

Also shown in panel (b) are gain thresholds in relation to starting gain levels, wherein the starting levels correspond to gain levels prior to reception of instances of one or another of the particular power-control sequences. Each particular gain adjustment that results in a gain threshold being exceeded is specifically identified for the purposes of the present discussion.

Initially (at the left side of the figure), the threshold payload size is set to an initial value 402. As with FIG. 3, the initial value (selected from the list of values) could be 6,144 bits. Power-control commands 1, 2, 3, and 4 are again four alternating power-up and power-down commands, and again, time interval $\Delta t_1$ begins between power-control commands #4 (a power-down command) and #5 (a power-up command), and ends between power-control commands #9 (a power-up command) and #10 (a power-down command). At the start of $\Delta t_1$, i.e., prior to the reception of the first particular sequence of power-control commands, the AT is operating at starting gain level 404, and the threshold increase amount 406 is taken by way of example to be 2.5 dB above the starting level. Evidently, during $\Delta t_1$, five power-control commands (5, 6, 7, 8, 9) are received, such that the net increase to transmission power is 3 dB. As indicated, gain increase 407 responsive to power-up command #9 is the adjustment that exceeds the threshold increase amount 406. Thus, the five power-control commands received during time interval $\Delta t_1$ correspond to reception by the AT of an instance of the first particular sequence of power-control commands. Having received the first particular sequence of power-control commands, the AT therefore decreases the value of the threshold payload size after $\Delta t_1$ to a new value 408. As with the example in FIG. 3, the new value could be 4,096 bits. Three alternating power-down and power-up commands (10, 11, 12) are then received, followed by time interval $\Delta t_2$, which begins between power-control commands #12 (a power-down command) and #13 (a power-up command) and ends between power-control commands #17 (a power-up command) and #18 (a power-up command). At the start of $\Delta t_2$, the AT is operating at starting gain level 410, and the threshold increase amount 412 is again taken to be 2.5 dB above the starting level. During $\Delta t_2$, five power-control commands (13, 14, 15, 16, 17) are received, such that again the net increase to transmission power is 3 dB. As indicated, gain increase 413 responsive to power-up command #17 is the adjustment that exceeds the threshold increase amount 412. Thus, the five power-control commands received during time interval $\Delta t_2$ correspond to reception by the AT of a second instance of the first particular sequence of power-control commands, and the AT again decreases the value of the threshold payload size, this time after $\Delta t_2$ to a new value 414. Again setting the value according to the list, the new value could be 3,072 bits.

As with FIG. 3, the timeline implicitly continues beyond power-control command #19 and picks up again explicitly at power-control command N, at which point threshold payload size value 414 is still in effect. Time interval $\Delta t_3$ then begins between power-control commands N+1 (a power-up command) and N+2 (a power-down command) and ends between power-control commands N+6 (a power-down command) and N+7 (a power-up command). At the start of $\Delta t_3$, the AT is operating at starting gain level 416, and the threshold decrease amount 418 is taken to be 2.5 dB below the starting level (i.e., −2.5 dB with respect to the starting level). During $\Delta t_3$, five power-control commands (N+2, N+3, N+4, N+5, N+6) are received, such that the net decrease to transmission power is −3 dB. As indicated, gain decrease 419 responsive to power-down command N+6 is the adjustment that exceeds the threshold decrease amount 418. Thus, the five power-control commands received during time interval $\Delta t_3$ correspond to reception by the AT of an instance of the second particular sequence of power-control commands, and the AT responsively increases the value of the threshold payload size after $\Delta t_3$ to a new value 420. Setting the value once again according to the list, the new value could be 4,096 bits.

Finally, as with FIG. 3, time interval $\Delta t_4$ begins coincident with the end of $\Delta t_3$, and continues until a time between power-control commands N+11 (a power-down command) and N+12 (a power-up command). At the start of $\Delta t_4$, the AT is operating at starting gain level 422, and the threshold decrease amount 424 is again taken to be 2.5 dB below the starting level. During $\Delta t_4$, five power-control commands (N+7, N+8, N+9, N+10, N+11) are received, such that again the net decrease to transmission power is −3 dB. As indicated, gain decrease 425 responsive to power-down command N+11 is the adjustment that exceeds the threshold decrease amount 424. Thus, the five power-control commands received during time interval $\Delta t_4$ correspond to reception by the AT of a second instance of the second particular sequence of power-control commands, and the AT again responsively increases the value of the threshold payload size, this time after $\Delta t_4$ to a new value 426. The new value could be 6,144 bits, where the value is again selected from the table.

The example operation depicted in FIG. 4 again illustrates that instances of reception by the AT of the first and second particular sequences of power-control commands can be occur in arbitrary multiplicity and arbitrary order. As in the example operation shown in FIG. 3, the AT responds to each instance by appropriately adjusting (downward or upward) the value of the threshold payload size (AuxiliaryPilotChannelMinPayload). It will be appreciated that the threshold amounts of power increase and/or decrease used in defining the first and second particular sequences of power control commands could be other than the example value of 2.5 dB in the above discussion.

4. IMPLEMENTATION OF EXAMPLE EMBODIMENT

The example embodiment described above can be implemented as a method carried out on an access terminal or other communication device that operates according to IS-856 in a similarly-compliant wireless communication system such as the one described above in connection with FIG. 2. The logical steps and operations of the method are described in the next subsection. Example means for carrying out the method are described in the subsequent subsection.

a. Example Method Implementations

Figure 5:
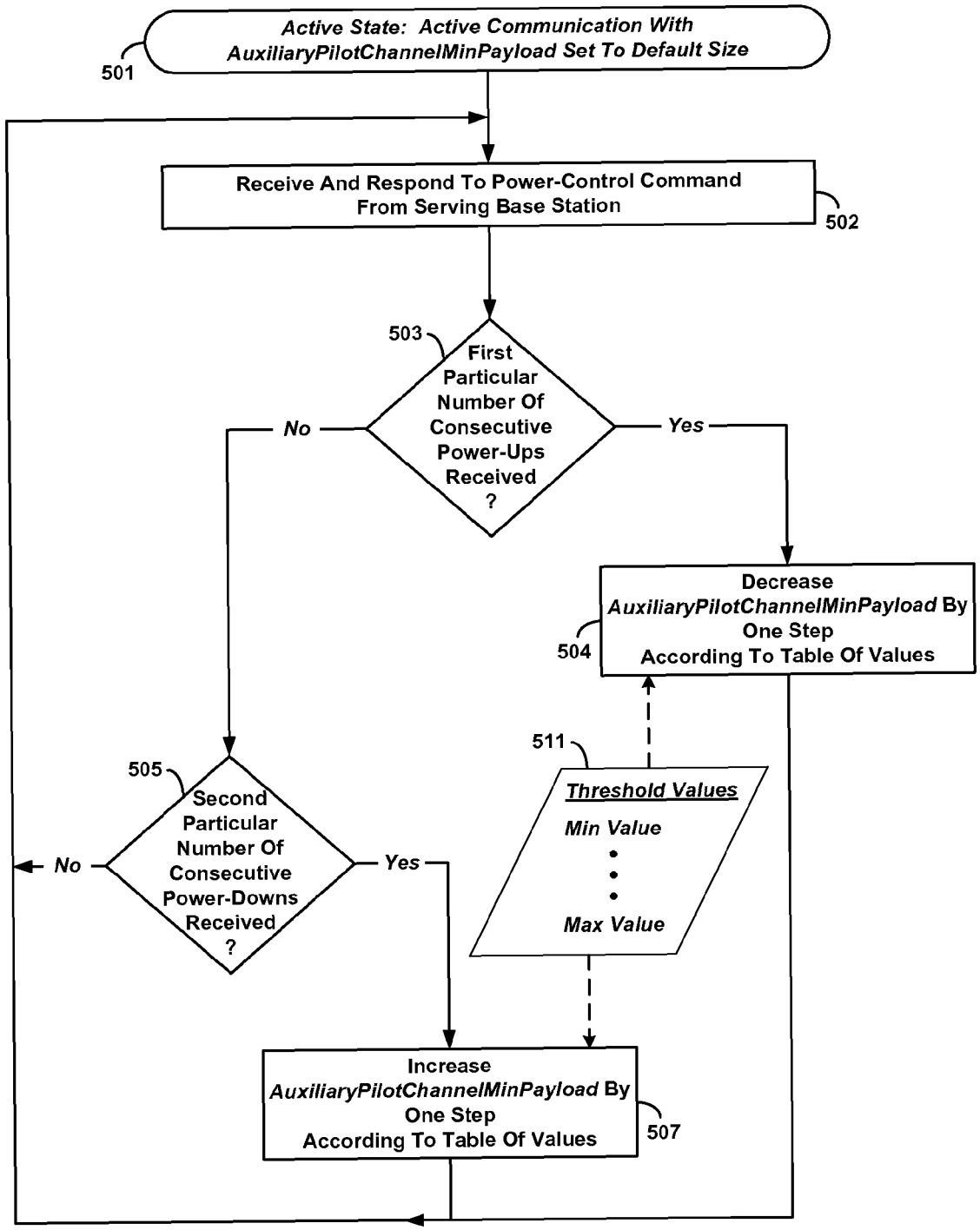
FIG. 5 illustrates an example embodiment of dynamic adjustment of threshold payload size for triggering an auxiliary pilot, wherein dynamic adjustment is based on consecutive power-up and/or consecutive power-down commands.
Figure 6:
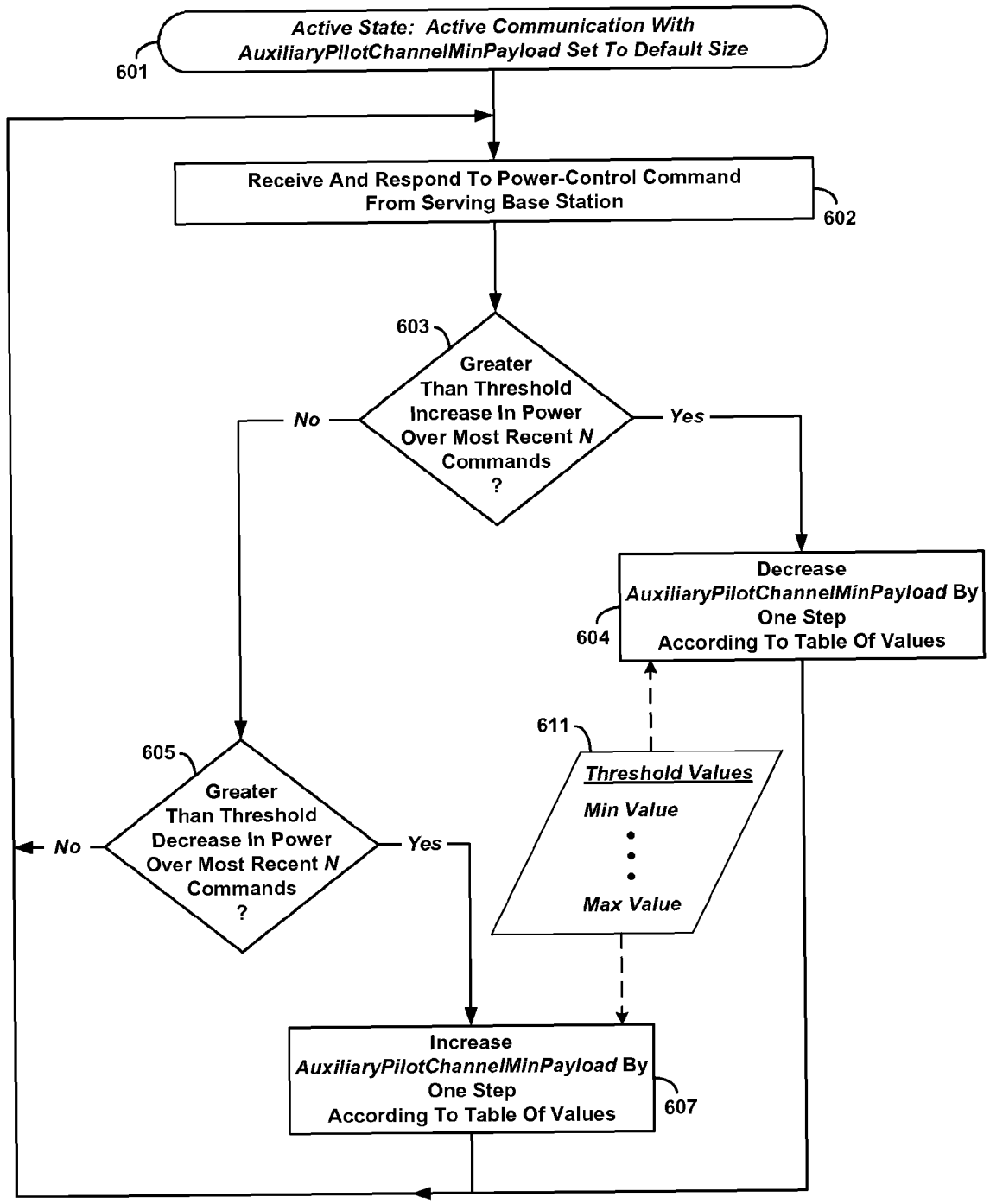
FIG. 6 illustrates an example embodiment of dynamic adjustment of threshold payload size for triggering an auxiliary pilot, wherein dynamic adjustment is based on threshold power increases and/or threshold power decreases.

Implementations of the example embodiments illustrated operationally above are shown in FIGS. 5 and 6. FIG. 5 depicts dynamic adjustment of threshold payload size for triggering an auxiliary pilot for the embodiment in which the first and second particular sequences of power-control commands are first and second numbers of consecutive power-up and power-down commands. FIG. 6 depicts dynamic adjustment of threshold payload size for triggering an auxiliary pilot for the embodiment in which the first and second particular sequences of power-control commands incorporate thresholds of transmission power adjustment. Both figures show the respective method aspects in the form of logical flowcharts. As such, either or both could be implemented in an access terminal (or similar device) as executable instructions stored in the memory of the AT and executed by one or more processors of the AT.

At the start 501 in FIG. 5, by way of example, the AT is in an active state in which it is engaged in a communication session or call via a base station in a wireless communication system. For instance, the AT could be engaged in a data communication session in accordance with IS-856, as described above in connection with FIG. 2. As in the example above threshold payload size could be designated as AuxiliaryPilotChannelMinPayload, wherein as used in embodiments of the present invention, this parameter is set dynamically. At the start 501, AuxiliaryPilotChannelMinPayload is set to a default (or initial) value. For instance, specifying values from the table of values above, a default or initial value could be 3,072 bits. In accordance with being in the active state, the AT will switch its auxiliary pilot on and off in response to the payload sizes of the packets that it transmits being larger than or smaller than AuxiliaryPilotChannelMinPayload.

At step 502, the access terminal receives a power-control command from the serving base station and responsively adjusts the transmission power on its air interface. Operating according a CDMA family of protocols, including IS-856, each power-control command will be a power-up or power-down command sent by the base station according to inner-loop power-control protocols, as described above. The AT will increase transmission power (or gain) for each power-up command, and decrease transmission power (or gain) for each power-down command.

At step 503, the AT determines if a first particular number of consecutive power-ups have been received, wherein the power-control command received at step 502 is included in the determination. In practice, the AT can maintain in its memory (e.g., solid state memory) a first tally of received power-up commands within a sliding window of length equal to the first particular number. For example, taking the first particular number to be five, the AT can begin counting upon the first power-up command following reception of a power-down command. Thereafter, each time a power-up command is received consecutively with a previous power-up command, the first tally will be increased. If the first tally reaches five, the first particular number of consecutive power-up commands will have been received. If a power-down command is received prior the first tally reaching five, then the counter will be reset to zero.

Increasing the first tally will again begin upon the next received power-up command. Zeroing the counter may be viewed as sliding the window to a new starting point.

If the first particular number of consecutive power-up commands has been received ("Yes" branch from step 503), then the access terminal will (at step 504) decrease AuxiliaryPilotChannelMinPayload by one step according the table of Threshold Values 511. The table 511 could contain, for example, the values in the table in the discussion above (including a minimum value and a maximum value), and could be maintained in the AT's memory (e.g., solid state memory). In decreasing AuxiliaryPilotChannelMinPayload by one step size, the AT would ensure that no value smaller than the minimum value is ever specified.

After the value of AuxiliaryPilotChannelMinPayload is decreased, the first tally of consecutive power-up commands would be zeroed and the process would then return to step 502. The process would then repeat upon reception at step 502 of the next power-control command.

If the first particular number of consecutive power-up commands has not been received ("No" branch from step 503), then the process would proceed to step 505, where the AT determines if a second particular number of consecutive power-downs have been received. There are two conditions corresponding to the first particular number of consecutive power-up commands not having been received. One is that the first tally of consecutively-received power-up commands is greater than zero but less than the first particular number (e.g., five). The second is that the power-control command received at step 502 was a power-down command, so that the first tally has been zeroed (if it is not already zero). In either case, the "No" branch from step 503 leads to decision block 505.

Thus AT determines at step 505 if a second particular number of consecutive power-downs have been received, wherein the power-control command received at step 502 is included in the determination. As with power-up commands, the AT can maintain in its memory (e.g., solid state memory) a second tally of received power-down commands within a sliding window of length equal to the second particular number. Again taking the second particular number to be five, the AT can begin counting upon the first power-down command following reception of a power-up command. Thereafter, each time a power-down command is received consecutively with a previous power-down command, the second tally will be increased. If the second tally reaches five, the second particular number of consecutive power-down commands will have been received. If a power-up command is received prior the second tally reaching five, then the counter will be reset to zero. Increasing the second tally will again begin upon the next received power-down command. As with the first tally, zeroing the counter may be viewed as sliding the window to a new starting point.

If the second particular number of consecutive power-down commands has not been received ("No" branch from step 505), then the process would return to step 502, where the AT would wait to receive and respond to the next power-control command. Similarly to counting of power-up commands, there are two conditions corresponding to the second particular number of consecutive power-down commands not having been received. One is that the second tally of consecutively-received power-down commands is greater than zero but less than the second particular number (e.g., five). The second is that the power-control command received at step 502 was a power-up command, so that the second tally has been zeroed (if it was not already zero). In either case, the "No" branch from step 505 leads back to step 502.

If the second particular number of consecutive power-up commands has been received ("Yes" branch from step 505), then the access terminal will (at step 507) increase AuxiliaryPilotChannelMinPayload by one step according the same table of Threshold Values 511. In increasing AuxiliaryPilotChannelMinPayload by one step size, the AT would ensure that no value larger than the maximum value is ever specified.

After the value of AuxiliaryPilotChannelMinPayload is increased, the second tally of consecutive power-down commands would be zeroed and the process would then return to step 502. Again, the process would then repeat upon reception at step 502 of the next power-control command. The process represented by the flowchart in FIG. 5 would repeat as long as the AT remained in an active state.

FIG. 6 depicts dynamic adjustment of threshold payload size for triggering an auxiliary pilot for the embodiment in which the first and second particular sequences of power-control commands incorporate thresholds of transmission power adjustment. The actions at each of the steps of the flowchart in FIG. 6 are identical to those in FIG. 5, with the exceptions of steps 603 and 605 explained below. Note that the steps in the two flowcharts are similarly numbered so that the correspondence of steps between the two flowcharts is easily determined by inspection. For instance, step 501 in FIG. 5 corresponds to step 601 in FIG. 6, step 502 in FIG. 5 corresponds to step 602 in FIG. 6, step 503 in FIG. 5 corresponds to step 603 in FIG. 6, and so on.

Whereas at step 503 in FIG. 5 the AT determines if the first particular number of consecutive power-ups have been received, at the corresponding step 603 in FIG. 6, the AT determines a net power-adjustment made over the last N received power-control commands (including the one received at step 602) has exceeded a threshold amount of power increase. Similarly to the tallies described in connection with FIG. 5, the AT could maintain a first tally of net power increment within a sliding window of length N. If the threshold amount of power increase has been exceeded ("Yes" branch from step 603), then the process would advance to step 604, which is identical to step 504 in FIG. 5. If the threshold amount of power increase has not been exceeded ("No" branch from step 603), then the process would advance to step 605.

Whereas at step 505 in FIG. 5 the AT determines if the second particular number of consecutive power-downs have been received, at the corresponding step 605 in FIG. 6, the AT determines a net power-adjustment made over the last N received power-control commands (including the one received at step 602) has exceeded a threshold amount of power decrease. Again, the AT could maintain a second tally of net power decrement within a sliding window of length N. If the threshold amount of power decrease has been exceeded ("Yes" branch from step 605), then the process would advance to step 607, which is identical to step 507 in FIG. 5.

If the threshold amount of power decrease has not been exceeded ("No" branch from step 605), then the process would return to step 602. Again, the process would then repeat upon reception at step 602 of the next power-control command.

Since other than steps 603 and 605, the steps of FIG. 6 are the same as those with corresponding numbers in FIG. 5, the explanation of the steps of FIG. 5 applies to the correspondingly numbered steps of FIG. 6. As with FIG. 5, the process represented by the flowchart in FIG. 6 would repeat as long as the AT remained in an active state. Note that the value of N used at step 605 could be the same or different from that used at step 603.

It will be appreciated that the steps shown in FIGS. 5 and 6 are meant to illustrate operation of example embodiments. As such, various steps could be altered or modified, and the ordering of certain steps could be changed, while still achieving the overall desired operation.

b. Example Access Terminal

Figure 7:
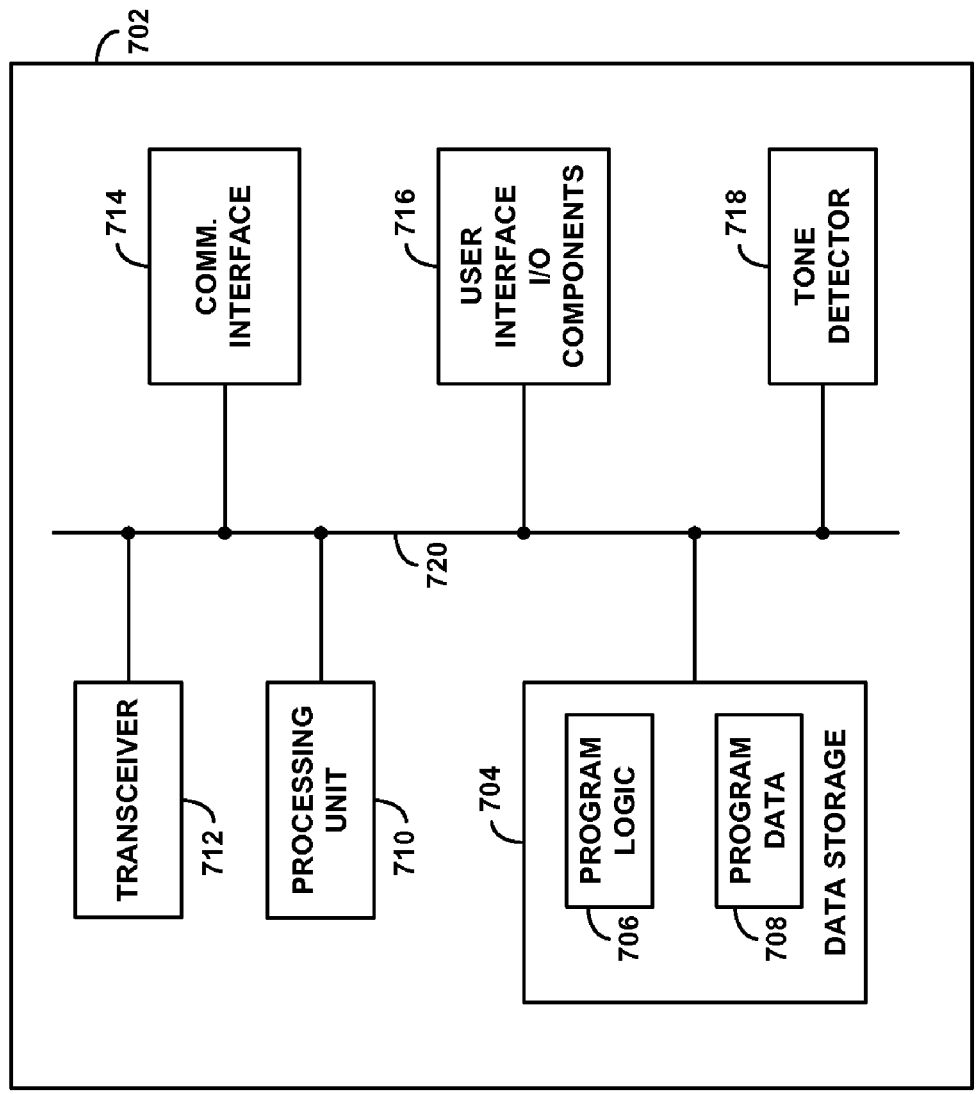
FIG. 7 is a block diagram of an example access terminal in which dynamic adjustment of threshold payload size for triggering an auxiliary pilot may be implemented.

FIG. 7 is a simplified block diagram depicting functional components of an example access terminal 702 in which dynamic adjustment of threshold payload size for triggering an auxiliary pilot may be implemented. The example AT 702 could be a cell phone, a personal digital assistant (PDA), a pager, a wired or wirelessly-equipped notebook computer, or any other sort of device. As shown in FIG. 7, the example AT 702 includes data storage 704, processing unit 710, transceiver 712, communication interface 714, user-interface I/O components 716, and tone detector 718, all of which may be coupled together by a system bus 720 or other mechanism.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of AT 702 relevant to triggering a variable auxiliary pilot are discussed briefly below.

Communication interface 714 in combination with transceiver 712, which may include one or more antennas, enables communication with the network, including reception of power-control commands from the serving base station and transmission of both the primary and auxiliary pilots, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 710 comprises one or more general-purpose processors (e.g., INTEL microprocessors) and/or one or more special-purpose processors (e.g., dedicated digital signal processor, application specific integrated circuit, etc.). In turn, the data storage 704 comprises one or more volatile and/or non-volatile storage components, such as magnetic or optical memory or disk storage. Data storage 704 can be integrated in whole or in part with processing unit 710, as cache memory or registers for instance. In example AT 702, as shown, data storage 704 is configured to hold both program logic 706 and program data 708.

Program logic 706 may comprise machine language instructions that define routines executable by processing unit 710 to carry out various functions described herein. In particular the program logic, communication interface, and transceiver may operate cooperatively to carry out logical operation such as that discussed above and illustrated in FIGS. 5 and 6. Further, program data 708 may be arranged to store one or more tallies of power-control commands or of net power adjustments maintained in conjunction with the logical operations described above.

It will be appreciated that there can be numerous specific implementations of dynamic adjustment of threshold payload size for triggering an auxiliary pilot in an access terminal, such AT 702 illustrated in FIG. 7. Further, one of skill in the art would understand how to devise and build such an implementation. As such, AT 702 is representative of means for carrying out the method of triggering operation of a variable auxiliary pilot in accordance with the methods and steps described herein by way of example.

5. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal operating in a wireless communication system that includes a base station, a method comprising:

operating in a state in which (i) the access terminal transmits a primary beacon signal on an air interface communication link to the base station, and, (ii) upon a condition that the access terminal will transmit a packet having a size larger than a threshold packet size, the access terminal activates and transmits a secondary beacon signal on the air interface communication link to the base station concurrently with transmission of the primary beacon signal;

while operating in the state, upon receiving a first particular sequence of power-control commands from the base station, decreasing the threshold packet size by a decremental amount; and while operating in the state, upon receiving a second particular sequence of power-control commands from the base station, increasing the threshold packet size by an incremental amount.

2. The method of claim 1, wherein the access terminal and the wireless communication system both operate at least according to IS-856, and wherein the primary beacon signal is a primary pilot signal and the secondary beacon signal is an auxiliary pilot signal.

3. The method of claim 1, wherein the access terminal and the wireless communication system both operate according to a CDMA family of protocols including IS-856, wherein the power-control commands comprise power-up and power-down commands sent by the base station according to inner-loop power-control protocols, wherein the threshold packet size corresponds to a value of AuxiliaryPilotChannelMinPayload, and wherein the condition that the access terminal will transmit a packet having a size larger than a threshold packet size corresponds to a condition that the access terminal will transmit a packet having a payload size larger than AuxiliaryPilotChannelMinPayload.

4. The method of claim 1, wherein the primary beacon signal is used by the base station to maintain a common timing reference between the access terminal and the base station, the common timing reference facilitating decoding by the base station of other signals received from the access terminal, and wherein the secondary beacon signal is used by the base station to enhance reliability of the common timing reference.

5. The method of claim 1, wherein receiving the first particular sequence of power-control commands from the base station comprises sequentially receiving a first particular number of consecutive power-increment commands from the base station, and wherein receiving the second particular sequence of power-control commands from the base station comprises sequentially receiving a second particular number of consecutive power-decrement commands from the base station.

6. The method of claim 1, wherein the power-control commands comprise power-increment commands and power-decrement commands, wherein the access terminal increments transmission power on the air interface each time the access terminal receives a power-increment command, and the access terminal decrements transmission power on the air interface each time the access terminal receives a power-decrement command, wherein receiving the first particular sequence of power-control commands from the base station comprises determining that a net increase to the transmission power corresponding to the first particular sequence of power-control commands is greater than a threshold amount of increased power, and wherein receiving the second particular sequence of power-control commands from the base station comprises determining that a net decrease to the transmission power corresponding to the second particular sequence of power-control commands is greater than a threshold amount of decreased power.

7. The method of claim 1, wherein the threshold packet size has a current value, the current value being a value prior to receiving the first particular sequence of power-control commands from the base station, and wherein decreasing the threshold packet size by a decremental amount comprises decreasing the threshold packet size by an amount based on the current value.

8. The method of claim 7, wherein the current value is one of a table of distinct values that is arranged in increasing order from a minimum value to a maximum value, and wherein decreasing the threshold packet size by an amount based on the current value comprises:

setting the threshold packet size to a value that is the next smaller of the distinct values in the table ahead of the current value if the current value is not the minimum value; and decreasing the threshold packet size by zero if the current value is the minimum value.

9. The method of claim 7, wherein decreasing the threshold packet size by an amount based on the current value comprises decreasing the threshold packet size by zero if the current value is equal to a minimum value.

10. The method of claim 1, wherein the threshold packet size has a current value, the current value being a value prior to receiving the second particular sequence of power-control commands from the base station, and wherein increasing the threshold packet size by an incremental amount comprises increasing the threshold packet size by an amount based on the current value.

11. The method of claim 10, wherein the current value is one of a table of distinct values that is arranged in increasing order from a minimum value to a maximum value, and wherein increasing the threshold packet size by an amount based on the current value comprises:

setting the threshold packet size to a value that is the next larger of the distinct values in the table beyond the current value if the current value is not the maximum value; and increasing the threshold packet size by zero if the current value is the maximum value.

12. The method of claim 10, wherein increasing the threshold packet size by an amount based on the current value comprises increasing the threshold packet size by zero if the current value is equal to a maximum value.

13. In an access terminal operating in a wireless communication system that includes a base station, a method comprising:

on an air interface communication link from the access terminal to the base station, transmitting a primary beacon signal to the base station;

setting a threshold packet size based on receiving a particular sequence of power-control commands from the base station; and upon a condition that the access terminal will transmit a packet having a size larger than the threshold packet size, activating and transmitting a secondary beacon signal on the air interface communication link to the base station concurrently with transmission of the primary beacon signal.

14. The method of claim 12, wherein the access terminal and the wireless communication system both operate according to a CDMA family of protocols including IS-856, wherein the primary beacon signal is a primary pilot signal and the secondary beacon signal is an auxiliary pilot signal, wherein the power-control commands comprise power-up and power-down commands sent by the base station according to inner-loop power-control protocols, wherein the threshold packet size corresponds to a value of AuxiliaryPilotChannelMinPayload, and wherein the condition that the access terminal will transmit a packet having a size larger than a threshold packet size corresponds to a condition that the access terminal will transmit a packet having a payload size larger than AuxiliaryPilotChannelMinPayload.

15. The method of claim 13, wherein the primary beacon signal is used by the base station to maintain a common timing reference between the access terminal and the base station, the common timing reference facilitating decoding by the base station of other signals received from the access terminal, and wherein the secondary beacon signal is used by the base station to enhance reliability of the common timing reference.

16. The method of claim 13, wherein the power-control commands comprise power-increment commands and power-decrement commands, wherein the access terminal increments transmission power on the air interface each time the access terminal receives a power-increment command, and the access terminal decrements transmission power on the air interface each time the access terminal receives a power-decrement command, and wherein setting the threshold packet size based on receiving the particular sequence of power-control commands from the base station comprises:

decreasing the threshold packet size by a decremental amount upon a condition of receiving a first particular number of consecutive power-increment commands from the base station; and increasing the threshold packet size by an incremental amount upon a condition of receiving a second particular number of consecutive power-decrement commands from the base station.

17. The method of claim 16, wherein decreasing the threshold packet size by a decremental amount comprises decreasing the threshold packet size by zero to prevent decreasing the threshold packet size below a minimum allowed size, and wherein increasing the threshold packet size by an incremental amount comprises increasing the threshold packet size by zero to prevent increasing the threshold packet size above a maximum allowed size.

18. The method of claim 13, wherein the power-control commands comprise power-increment commands and power-decrement commands, wherein the access terminal increments transmission power on the air interface each time the access terminal receives a power-increment command, and the access terminal decrements transmission power on the air interface each time the access terminal receives a power-decrement command, and wherein setting the threshold packet size based on receiving the particular sequence of power-control commands from the base station comprises:

decreasing the threshold packet size by a decremental amount upon a determination that a net increase to the transmission power corresponding to the particular sequence of power-control commands is greater than a threshold amount of increased power; and increasing the threshold packet size by an incremental amount upon a determination that a net decrease to the transmission power corresponding to the particular sequence of power-control commands is greater than a threshold amount of decreased power.

19. The method of claim 18, wherein decreasing the threshold packet size by a decremental amount comprises decreasing the threshold packet size by zero to prevent decreasing the threshold packet size below a minimum allowed size, and wherein increasing the threshold packet size by an incremental amount comprises increasing the threshold packet size by zero to prevent increasing the threshold packet size above a maximum allowed size.

20. In an access terminal operating in a wireless communication system that includes a base station, an improvement comprising:

means for transmitting a primary beacon signal to the base station on an air interface communication link from the access terminal to the base station;

means for setting a threshold packet size based on receiving a particular sequence of power-control commands from the base station; and means for, upon a condition that the access terminal will transmit a packet having a size larger than the threshold packet size, activating and transmitting a secondary beacon signal on the air interface communication link to the base station concurrently with transmission of the primary beacon signal.

21. The improvement of claim 20, wherein the access terminal and the wireless communication system both operate according to a CDMA family of protocols including IS-856, wherein the primary beacon signal is a primary pilot signal and the secondary beacon signal is an auxiliary pilot signal, wherein the power-control commands comprise power-up and power-down commands sent by the base station according to inner-loop power-control protocols, wherein the threshold packet size corresponds to a value of AuxiliaryPilotChannelMinPayload, and wherein the condition that the access terminal will transmit a packet having a size larger than a threshold packet size corresponds to a condition that the access terminal will transmit a packet having a payload size larger than AuxiliaryPilotChannelMinPayload.

22. The improvement of claim 20, wherein the primary beacon signal is used by the base station to maintain a common timing reference between the access terminal and the base station, the common timing reference facilitating decoding by the base station of other signals received from the access terminal, and wherein the secondary beacon signal is used by the base station to enhance reliability of the common timing reference.

23. The improvement of claim 20, wherein the power-control commands comprise power-increment commands and power-decrement commands, wherein the access terminal increments transmission power on the air interface each time the access terminal receives a power-increment command, and the access terminal decrements transmission power on the air interface each time the access terminal receives a power-decrement command, and wherein means for setting the threshold packet size based on receiving the particular sequence of power-control commands from the base station comprise:

means for decreasing the threshold packet size by a decremental amount upon a condition of receiving a first particular number of consecutive power-increment commands from the base station; and means for increasing the threshold packet size by an incremental amount upon a condition of receiving a second particular number of consecutive power-decrement commands from the base station.

24. The improvement of claim 23, wherein means for decreasing the threshold packet size by a decremental amount comprise means for decreasing the threshold packet size by zero to prevent decreasing the threshold packet size below a minimum allowed size, and wherein means for increasing the threshold packet size by an incremental amount comprise means for increasing the threshold packet size by zero to prevent increasing the threshold packet size above a maximum allowed size.

25. The improvement of claim 20, wherein the power-control commands comprise power-increment commands and power-decrement commands, wherein the access terminal increments transmission power on the air interface each time the access terminal receives a power-increment command, and the access terminal decrements transmission power on the air interface each time the access terminal receives a power-decrement command, and wherein means for setting the threshold packet size based on receiving the particular sequence of power-control commands from the base station comprise:

means for decreasing the threshold packet size by a decremental amount upon a determination that a net increase to the transmission power corresponding to the particular sequence of power-control commands is greater than a threshold amount of increased power; and means for increasing the threshold packet size by an incremental amount upon a determination that a net decrease to the transmission power corresponding to the particular sequence of power-control commands is greater than a threshold amount of decreased power.

26. The improvement of claim 25, wherein means for decreasing the threshold packet size by a decremental amount comprise means for decreasing the threshold packet size by zero to prevent decreasing the threshold packet size below a minimum allowed size, and wherein means for increasing the threshold packet size by an incremental amount comprise means for increasing the threshold packet size by zero to prevent increasing the threshold packet size above a maximum allowed size.

27. The improvement of claim 20, wherein the threshold packet size has a current value, the current value being a value prior to receiving the particular sequence of power-control commands from the base station, and wherein means for setting the threshold packet size based on receiving the particular sequence of power-control commands from the base station comprise:

means for decreasing the threshold packet size by an amount based on the current value; and means for increasing the threshold packet size by an amount based on the current value.

28. The improvement of claim 27, wherein the current value is one of a table of distinct values that is arranged in increasing order from a minimum value to a maximum value, wherein means for decreasing the threshold packet size by an amount based on the current value comprise:

means for setting the threshold packet size to a value that is the next smaller of the distinct values in the table ahead of the current value if the current value is not the minimum value; and means for decreasing the threshold packet size by zero if the current value is the minimum value, and wherein means for increasing the threshold packet size by an amount based on the current value comprise:

means for setting the threshold packet size to a value that is the next larger of the distinct values in the table beyond the current value if the current value is not the maximum value; and means for increasing the threshold packet size by zero if the current value is the maximum value.

* * * * *